United States Patent [19]

Orchard

[11] 4,241,699
[45] Dec. 30, 1980

[54] COW-RESTRAINING DEVICE

[76] Inventor: Paul D. Orchard, P.O. Box 74, Arago Station, Myrtle Point, Oreg. 97458

[21] Appl. No.: 25,491

[22] Filed: Mar. 30, 1979

[51] Int. Cl.³ .............................................. A01K 1/12
[52] U.S. Cl. .................... 119/14.03; 119/27; 119/147 R
[58] Field of Search ............... 119/14.03, 27, 148, 119/147, 149, 150

[56] References Cited

U.S. PATENT DOCUMENTS

| 290,620 | 12/1883 | Wood | 119/150 |
|---|---|---|---|
| 2,198,048 | 4/1940 | Babson et al. | 119/27 |
| 2,754,803 | 7/1956 | Stammel | 119/148 |
| 3,703,884 | 11/1972 | Maddalena et al. | 119/27 |

FOREIGN PATENT DOCUMENTS 819671  9/1959  United Kingdom ..................... 119/147

Primary Examiner—Hugh R. Chamblee
Attorney, Agent, or Firm—Kolisch, Hartwell & Dickinson

[57] ABSTRACT

A cow-milking parlor includes an elongate milking pit, and a plurality of head locks or restraining devices which are arranged in a row paralleling the pit's long axis. The head locks cooperate with an elevated bar extending along the pit to confine the cows at an oblique angle with respect to the pit axis. Each head lock includes an upright fixed-position bar and an upright locking bar having a locking portion which is shiftable relative to the fixed-position bar, toward and away from a restraining position. The plural head locks are actuated coordinately by a gang rod connecting the locking bars to a suitable driving mechanism.

5 Claims, 5 Drawing Figures

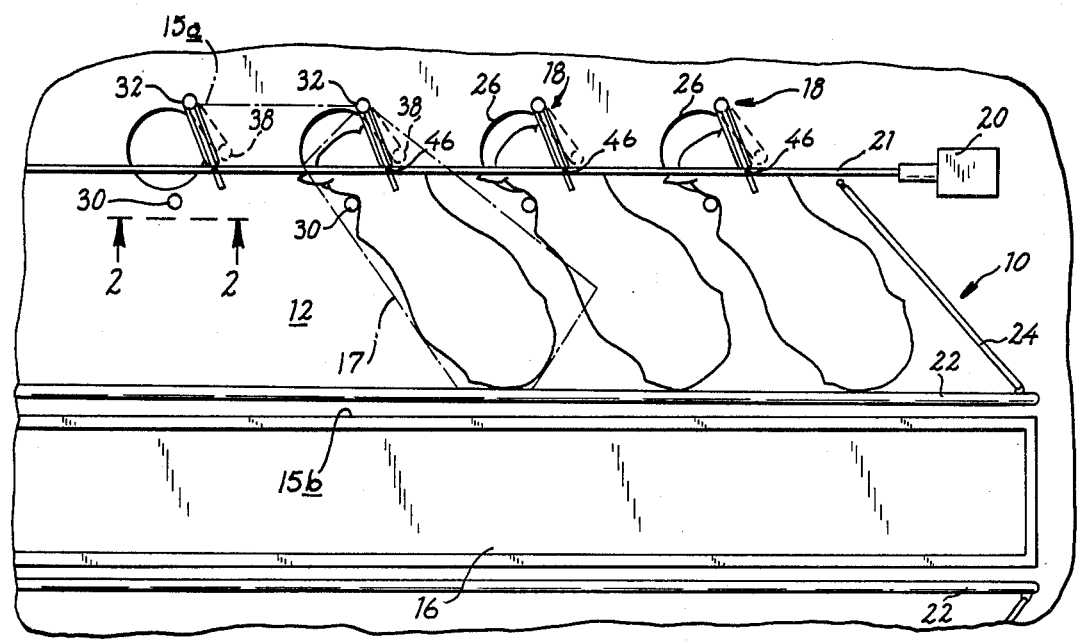
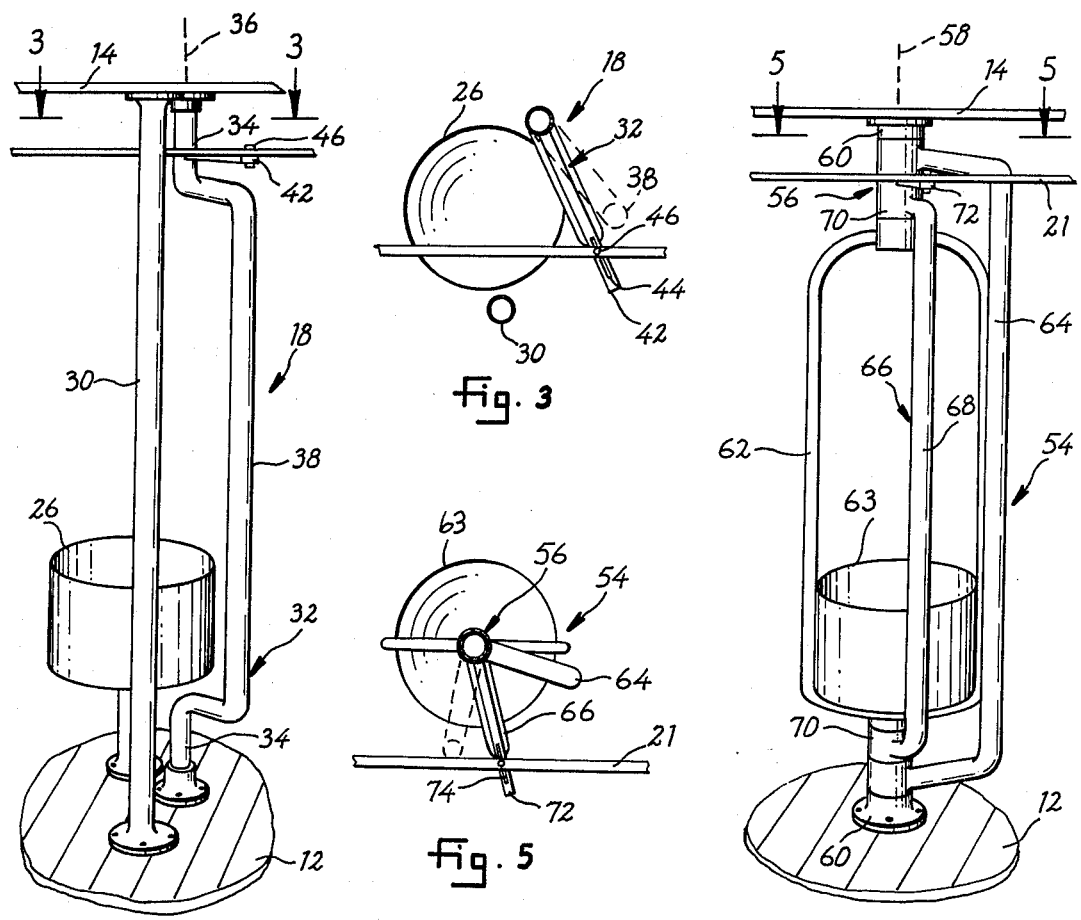

COW-RESTRAINING DEVICE

BACKGROUND AND SUMMARY

The present invention relates to cow-restraining devices, and in particular, to the construction and arrangement of such devices in a cow-milking parlor.

Cow-milking parlors in which rows of cows are confined for milking are known in the prior art. Generally, such parlors include an elongate pit, and a plurality of head locks for confining a plurality of cows—one in each head lock—in a row. Typically, the head locks are arranged, with respect to the pit, so that the lock-restrained cows are positioned substantially perpendicular to the long axis of the pit, with the rear portions of the cows facing the pit. Often, during a milking operation, the cows tend to become restless, and in this just-described position, they tend to shift about on their rear legs. This creates obvious problems for the person in the pit attempting to milk the cows.

A common type of head lock used in the above-described milking parlor includes a pair of neck-engaging members, each of which is relatively shiftable, toward and away from one another, between releasing and restraining positions. The mechanism by which the positions of the two bars of a head lock are coordinately controlled, particularly in a cow milking station, where it is desired to control plural head locks in unison, is necessarily somewhat complex.

One important object of the present invention is to provide a milking parlor in which a row of cows can be restrained at an oblique angle with respect to an elongate pit, wherein shifting of the cows during milking is substantially prevented.

Still another object of the invention is to provide, for use in a milking parlor, a novel restraining device or head lock which can be operated between confining and releasing positions by movement of a single bar.

Yet another object of the invention is to provide, in a milking parlor, a plurality of such head locks which can be operated, in unison, by movement of a single gang rod.

The present invention in a cow-milking parlor includes an elongate pit, and plurality of head locks which are arranged in a row paralleling the pit's long axis. The head locks are oriented to position the cows, when the same are restrained thereby, at an oblique angle with respect to the pit axis. An elevated bar, extending along the side of the pit, further serves to restrain the cows at such an angle.

Each of the head locks includes an upright, fixed-position bar, and an upright locking bar, a portion of which is shiftable, relative to the fixed-position bar, toward and away from a restraining position, wherein a cow's head is locked between the two bars. The locking bars in a row of head locks are connected to a common gang rod, for coordinate movement therewith, under the operation of a powered ram.

These and other objects and features of the present invention will become more apparent when considered with the following detailed description of preferred embodiments of the invention, and the accompanying drawings, wherein:

FIG. 1 is a fragmentary plan view of a cow-milking parlor constructed including restraining devices according to a preferred embodiment of the invention.

FIG. 2 is a side view of a preferred embodiment of a head lock employed in the cow-milking parlor of FIG. 1, taken generally along line 2—2 in FIG. 1.

FIG. 3 is a sectional view of the head lock of of FIG. 2, taken generally along line 3—3 in this figure, showing two different positions for a locking bar.

FIG. 4 is a side view, similar to the view of FIG. 2, showing an alternate embodiment of a head lock usable in the present invention.

FIG. 5 is a sectional view of the head lock illustrated in FIG. 4, taken generally along line 5—5 in FIG. 4.

DETAILED DESCRIPTION OF PREFERRED EMBODIMENTS OF THE INVENTION

In FIG. 1, there is shown a fragmentary portion of a cow-milking parlor, indicated at 10, constructed according to a preferred embodiment of the invention. Parlor 10 typically is housed within a barn or the like having a floor 12 and ceiling 14, (FIG. 2). The parlor generally comprises an elongate, rectangular milking area or pit 16 which is bordered on either side by an elongate walk-through stall, such as stall 15 shown in FIG. 1. The two sides of stall 15, indicated here by the fragmentary dash-double-dot line 15a and by the solid line 15b, are spaced from, and adjacent pit 16, respectively, as can be seen. The parlor further includes a plurality of cow-restraining devices, or headlocks, such as locks 18, one for each cow, which are arranged along stall's side 15a for restraining cows at longitudinally spaced positions therealong. For each row of locks, there is provided a ram 20 connected to the locks through a common gang rod 21, for operating the locks coordinately, in a manner to be described.

Also included in parlor 10, for each stall, such as stall 15, is elongate fence means, such as fence 22 extending along and positioned adjacent side 15b of stall 15. Fence 22 is disposed above floor 12 at the rump level of cows within parlor 10, and cooperates with locks 18, in a manner shown, to confine cows restrained thereby within stall regions, such as the region indicated by dash-dot line 17 in FIG. 1. The just-mentioned regions extend between opposite sides of the stall, and are oriented at approximately 45° angles with respect thereto, as shown. Mounted adjacent each end of each bar 22 is a gate, such as 24, through which cows enter and exit the stall.

Completing a description of what is shown in FIG. 1, parlor 10 also includes a plurality of feed pans, such as pans 26, positioned adjacent associated locks 18 to permit a cow, when restrained in a head lock, to feed from the pan.

While not shown here, it is understood that the parlor additionally includes the various paraphernalia used in cow-milking operations, including suitable suction hoses and milking devices attachable to the cows.

Looking now at FIG. 2, each head lock 18 includes an upright fixed-position bar 30 which is mounted, at its opposed ends, on the floor and ceiling of the station housing. Mounted adjacent bar 30, for movement relative thereto, in a manner to be explained, is an upright locking bar 32. This bar includes a pair of co-axial end portions 34 which are mounted on the ceiling and floor of the milking station housing, as shown in FIG. 2, for rotation about a substantially vertical axis indicated by dashed line 36. Also forming part of bar 32 is a central locking portion 38 which is offset from portions 34, and extends substantially parallel to axis 36. Portion 38 is shiftable, with rotation of bar 32, between a restraining position, shown in solid lines in FIGS. 1, 2 and 3, and a releasing position, shown in dashed lines in FIGS. 1 and 3. With portion 38 in its restraining position, bar 30 and portion 38 are positioned adjacent opposite sides of the neck region of a cow, thereby to restrain the cow. Likewise, with portions 38 moved to its releasing position, bar and portion 38 are spaced apart to provide clearance for a cow's head. According to one important feature of the present invention, and with reference to FIG. 1, bars 30 and associated portions 38 are disposed, with portions 38 in their locking positions, to urge cows toward least-constrained positions extending approximately 45° with respect to the stall's long axis, as shown. Cow movement angularly away from the least-constrained position is prevented, in one direction, by fence 22, and, in the opposite direction, defines the upper right extent of stall regions, such as region 17, in FIG. 1.

With reference to FIGS. 2 and 3, attached to upper portion 34 of each bar 32 is a coupling arm 42 which extends outwardly therefrom. As seen in FIG. 3, arm 42 has formed therein an elongate slot 44 which is adapted to receive one of a plurality of pins, such as pins 46, mounted at suitable intervals along on rod 21. As can be appreciated with reference to FIG. 3, each slot 44 accommodates radial movement of the associated pin 46 therein as associated bar 32 is rotated, by longitudinal movement of rod 21, toward and away from its restraining position. Looking at FIG. 1, it can be appreciated that each lock 18, which is coupled to rod 21 in the manner just described, is coordinately controlled by actuation of ram 20. The just-described structure is also referred to herein as means operatively connected to the locking bars, for moving the associated locking portions, in unison, toward and away from their restraining positions.

In operation, cows are admitted into stall 15 through gate 24, and the animals take up positions at locks 18. Initially the locking portions of bars 32 are moved to their releasing positions, and the cows are induced to place their heads between associated bars 30 and portions 38 by their tendency to feed from associated pans 26. When all of the cows in a row are feeding, ram 20 is actuated to shift rod 21 in a right-to-left direction in FIG. 1, rotating bars 32 in a clockwise direction in the figure, thus shifting associated locking portions 38 to their restraining positions. The cows are now restrained in locks 18, which cooperate with bar 22 to position the cows within the stall regions, such as region 17, in stall 15, as discussed.

It can now be appreciated how various objects of the present invention are met. First, by the particular arrangement and orientation of head locks 18, relative to an elongate pit, a plurality of cows can be confined in a row at substantially oblique angles with respect to the pit.

Secondly, the novel head lock of the present invention is shiftable, by actuation of a single bar, between releasing and restraining positions. Further, the movable bars of a plurality of such locks may be coupled to a gang rod for coordinate movement therewith.

While a preferred embodiment of a head lock used in the present invention has been described, a second embodiment of a head lock, indicated at 54 in FIGS. 4 and 5, is also contemplated herein. Lock 54 generally includes an upright, fixed-position stand 56 which is mountable on the floor and ceiling of the milking station housing to extend along a substantially vertical axis, indicated by dashed line 58 in FIG. 4. Stand 56 includes a pair of opposed end portions 60 which are connected, at their inwardly facing ends by a tubular bifurcated frame 62. A feed pan 63 associated with each lock 54 is mounted on the lower portion of this frame as shown.

A fixed-position bar 64 is rigidly mounted on stand 58, adjacent the outer ends of portions 60, with the longitudinal axis of the bar being parallel to, and offset from axis 58, as shown. Also mounted on stand 58, for pivoting relative thereto, is a locking bar 66 having a locking portion 68 which is shiftable toward and away from bar 64. More specifically, bar 66 includes a pair of opposed sleeves 70 which are rotatably mounted on associated end portions 60, between the mountings thereon of bar 64 and frame 62, for rotation about axis 58. Locking portion 68 extends outwardly from the stand, and is parallel to, and offset from axis 58.

As can be seen best in FIG. 5, bar 66 also includes a coupling arm 72 which is attached to upper sleeve 70 and extends outwardly therefrom. Arm 72 includes an elongate slot 74 used in coupling bar 66 to gang rod 21, in the manner described with reference to lock 18. As can be appreciated with reference to FIG. 5, shifting of rod 21, along its longitudinal axis produces movement of locking portion 68 between a restraining position, shown here in solid lines and a releasing position, shown in dashed lines.

It is apparent that lock 54, when used in the abovedescribed cow parlor, provides all of the advantages of lock 18 discussed above, and the additional advantage, in installation, that the positional relationship between the fixed-position bar, the locking bar, and the feed pan is established.

A cow-milking parlor which is designed to confine a plurality of cows at a desired angle with respect to an elongate pit, with such confinement being effected by a plurality of cowrestraining devices which are operable, in unison, between restraining and releasing positions has thus been disclosed. Various changes and modifications may be made in the above-described milking parlor without departing from the spirit of the invention.

It is claimed and desired to secure by Letters Patent:
1. A walk-through cow milking parlor comprising
an elongate milking area,
an elongate walk-through stall having one and another sides adjacent and spaced from said area, respectively, extending substantially parallel thereto,
a plurality of cow-restraining devices, one for each cow, arranged, along said stall's other side for restraining cows at longitudinally spaced positions therealong,
each of said devices including an upright fixed-position bar, and an upright locking bar including a locking portion which is shiftable, relative to the fixed-position bar, toward and away from a restraining position, wherein said bars are positioned, adjacent opposite sides of the neck of a cow, to prevent withdrawal of the cow's head from between the bars, and wherein said bars are oriented to urge the cow toward a region of the stall extending between, and inclined with respect to, said stall sides,
elongate fence means extending along and positioned adjacent said stall's side to prevent cow movement beyond said fence means, toward said milking area, and means operatively connected to said locking bars for moving said locking portions, in unison, toward and away from their said restraining positions.

2. The parlor of claim 1, wherein each locking bar is mounted for rotation about a substantially vertical axis, and such locking portion is offset from said vertical axis.

3. The parlor of claim 1, wherein said fixed-position bar and locking bar have end portions mounted along a common, substantially vertical axis.

4. The station of claims 2 or 3, wherein said moving means includes a gang rod operatively connected to said locking bars and ram means operatively connected to said rod for shifting the same.

5. The parlor of claim 1, wherein said fence means restricts a cow, when restrained in one of said devices, to an associated stall region.

* * * * *